3,429,117
COMPOSITE NYLON CONTINUOUS FILAMENT YARNS
David L. Sherer, Charlotte, N.C., assignor to Celanese Corporation, New York, N.Y., a corporation of Delaware
Filed Sept. 21, 1965, Ser. No. 489,016
U.S. Cl. 57—140     5 Claims
Int. Cl. D02g 3/02

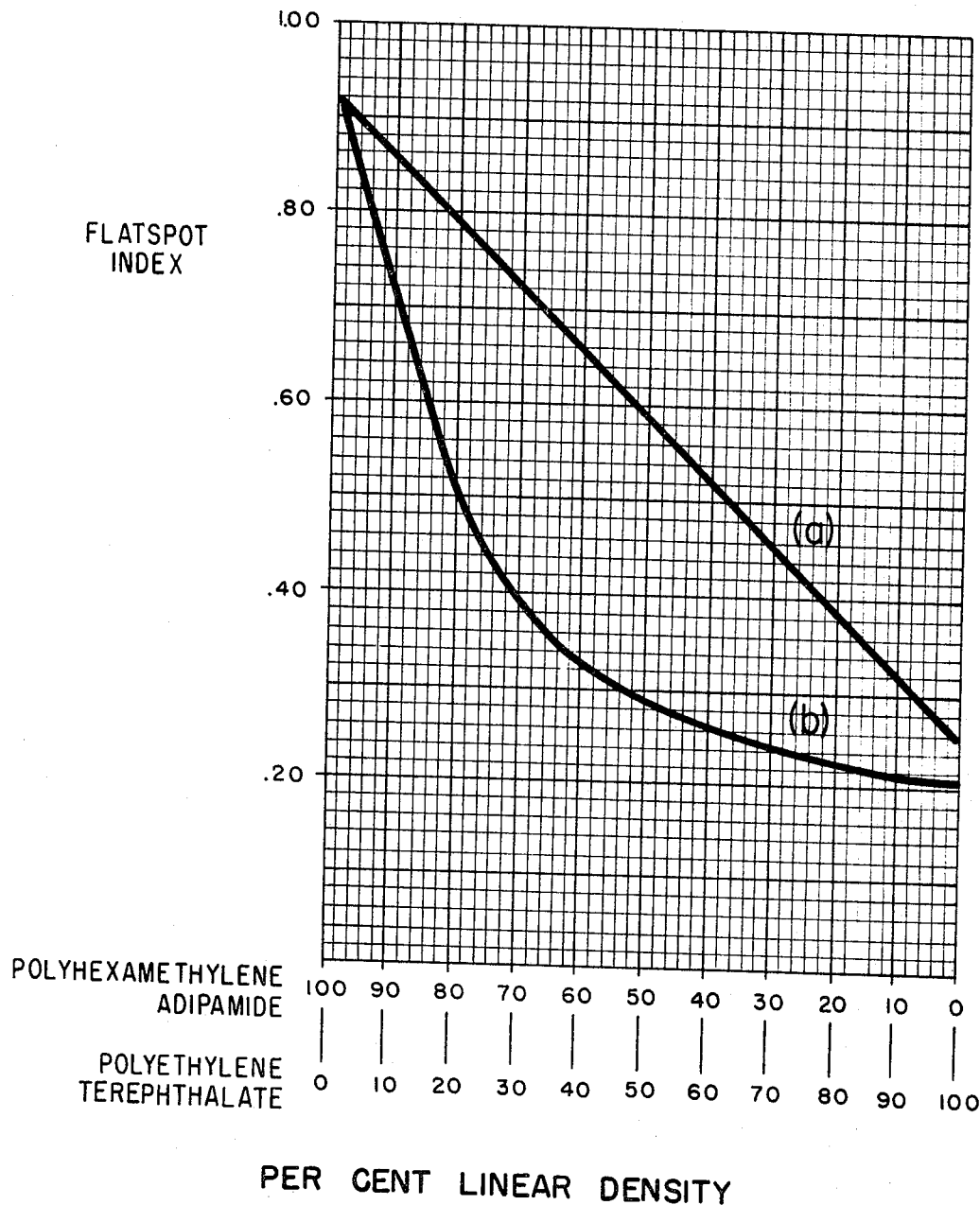

---

ABSTRACT OF THE DISCLOSURE

Continuous filaments of nylon and polyester are intimately blended together to produce a yarn blend. Twisted blended yarns are then plied together to make a tire cord which has been found to give reduced flatspotting properties.

---

This invention relates to composite nylon continuous filament yarns. More particularly, this invention relates to a composite of nylon and polyester continuous filament yarns which when incorporated into tires as plied cords significantly reduces the flatspotting properties of the tires.

The use of nylon continuous filament yarns in producing plied cords for incorporation into tires has been found to be highly satisfactory in producing replacement tires especially for trucks and cars. The disadvantage of nylon tire cords has been its tendency to flatspot when the tire is maintained under pressure of the weight of a vehicle in one position over a period of time. The flatspotting of a tire is attributed to the change of length of the nylon cord in one position and on the revolution of the tire a thumping sound is produced until the cord returns to its original length. The use of polyester tire cords (polyethylene terephthalate) has the advantage of having a minimum of the flatspotting problem, i.e., a thumping sound of the tire cannot be heard or observed by normal detection, but it is known that polyester tire cord is difficult to adhere to the rubber base of the tire.

Attempts have been made to produce a polyester-nylon tire cord by plying a nylon continuous filament yarn such as polyhexamethylene adipamide and a polyester continuous filament yarn (polyethylene terephthalate) together to produce a desirable tire cord which when incorporated in a tire would provide a substantial reduction of flatspotting. It was found that when homogeneous continuous filament nylon yarn and continuous filament polyester yarn were plied, a linear relationship of reduced flatspotting was observed when the content of polyester was increased in the plying operation. It was noted that the polyester content of the total cord had to be maintained in excess of 80 percent measured as linear density to eliminate substantially the undesirable effects of flatspotting in the finished tire. When the content of the cord exceeds 80 percent polyester, it is not considered practical to utilize nylon as the second component since no apparent advantage appears to be available.

By this invention, a nylon-containing tire cord yarn has been discovered which when incorporated into tires as plied cords, has significantly reduced flatspotting properties. This yarn is produced by blending continuous filaments of nylon and continuous filaments of polyester in the form of a yarn wherein the linear density of the nylon ranges from about 40 to about 80 percent, preferably from 50 to 80 percent, of the total yarn linear density. The blended continuous filament yarn requires an elongation at break in excess of about 10 percent and a tenacity in excess of 6 grams per denier to provide the desirable physical properties needed to produce a high quality tire cord. In order to provide the most desirable and efficient tire cord product, it is preferred that the stress-strain properties, especially the elongation at break, of the individual filaments of nylon and polyester be substantially identical in the blend to provide the highest overall strength.

The continuous filament yarns of this invention can be blended by running together nylon and polyester continuous filament yarns (preferably of zero twist) of various linear densities on a typical down twister or the yarns of the invention can be combined by entangling through an air jet if desired. The yarns thus produced are made into cords having approximately the same twist multiplier as is generally used in an all nylon cord. These cords thus produced are woven into tire cord fabric, dipped in adhesive, heat-treated, and used for tire building in a manner similar to other tire cord fiber types. As an example, 840 denier nylon 66 yarn and 440 denier polyester yarn were blended together by running both thru the same twister ring on a standard down twister. This process had the effect of first combining the two components and then twisting the blend yarn 10 turns per inch in the Z direction. Two of these twisted blend yarns were then cabled together using 10 turns per inch in the S direction, on the same down twister in a separate operation. The properties of each of the component yarns were as follows:

|                                | Nylon | Polyester |
|---|---|---|
| Linear Density (den.)          | 830   | 480       |
| Number of Filaments            | 140   | 96        |
| Breaking Strength (lb.)        | 16.4  | 6.3       |
| Breaking Elongation (percent)  | 13.2  | 14.7      |
| Initial Modulus (g./den.)      | 66    | 130       |
| Tenacity (g./den.)             | 9.0   | 6.0       |

The properties of the greige blend tire cord were as follows:

Breaking strength (lb.) _____ 41.3
Elongation at 10 lb. (percent) _____ 6.5
Elongation at break (percent) _____ 28.3
Initial modulus (g./den.) _____ 25
Linear density (den.) _____ 3001

The greige blend cord thus produced was dipped thru a resorcinol-formaldehyde-latex adhesive bath and dried and heat-treated under conditions which were chosen to simulate those normally used in the factory processing of tire cord. To simulate these conditions a laboratory piece of equipment was used which allows for the continuous treatment of a single end of tire cord. This equipment consists of a dip bath container, a drying oven, and a heat treating oven, with the suitable guides and variable speed wrap rolls with which to control the path and the amount of stretch to which the cord is to be submitted. The conditions used for this particular example were:

|                   | Temperature (° F.) | Dwell Time (sec.) | Stretch (percent) |
|---|---|---|---|
| Drying zone       | 300                | 30                | 0                 |
| Heat treating zone| 425                | 30                | 6                 |

The properties of the processed cord thus produced were:

Breaking strength (lb.) _____ 38.0
Elongation at 10 lb. (percent) _____ 4.2
Elongation at break (percent) _____ 14.6
Free shrinkage at 320° F. (percent) _____ 7.5
Tension force at 320° F. (lb.) _____ 2.6
Flatspot index _____ 0.4

The free shrinkage test was performed by heating the cord to 320° F. in a circulating air oven under zero tension, and measuring the cord shrinkage which occurred. The tension force test was performed by heating the cord to 320° F. under hold-to-length conditions and measuring the force of tension generated within the cord. To find the flatspot index [1], the cord was mounted under about $5.26 \times 10^{-3}$ grams per denier tension on an apparatus designed to magnify changes in length. The cord was then loaded with about 0.5 gram per denier and heated to 150° F. in a circulating air oven. After the rate of creep had decayed to an insignificant amount, the specimen was cooled slowly to 80° F. and its length was recorded as $L_i$. The above heating and cooling cycle was repeated, except that the load was removed during cooling. After the specimen was cooled to 80° F. the load was reapplied and the specimen length was recorded as $L_a$. The flatspot index I was calculated from:

$$I = \frac{100(L_i - L_a)}{L_g}$$

where $L_g$ was the initial gauge length of the specimen as mounted under pretension.

The accompanying drawing represents a correlation between the flatspotting index and the amount of polyethylene terephthalate in a combination of polyhexamethylene adipamide-polyethylene terephthalate incorporated into a tire cord in two ways. The line designated *a* represents the flatspotting of tire cords made up by utilizing individual yarns of polyhexamethylene adipamide and polyethylene terephthalate and plying these yarns together in the various amounts as shown in the graph. It should be noted that a linear relationship exists in the decrease of the flatspotting tendency as the content of polyester increases. The method of preparing these tire cords is by normal plying and testing for flatspotting as described in the example above. The line designated *b* represents the curve of a tire cord having a decreasing flatspotting tendency as the content of the polyethylene terephthalate yarns is increased when the individual yarns in the plied cord contain an intimate combination or blend of polyethylene terephthalate and polyhexamethylene adipamide continuous filaments in various amounts as shown in the graph. The method of preparing and testing the tire cord of line *b* is described as an example above. According to the flatspotting index test, a flatspot index in excess of 0.4 produces undesirable flatspotting in tires under conditions of existing pressure in one spot such as the weight of an automobile on a standing tire. At a flatspot index in excess of 0.4, a tire cord would provide a noticeable thumping sound on movement for a period of time until the tire cord reverted to its original length. On the other hand, a tire cord having a flatspot index below 0.4 reduces the noticeable thumping of the tire on movement to an acceptable level. It should be readily apparent by line *b* of the accompanying drawing that a significant drop in flatspotting occurs in the tire cords plied with the blended yarns of polyethylene terephthalate-polyhexamethylene adipamide as the polyethylene terephthalate increases. At the 30 percent level (linear density) of polyethylene terephthalate of the blended yarns of this invention, surprisingly the flatspotting index fell below 0.4 which is highly desirable in comparison with the flatspotting index of approximately 0.7 at 30 percent polyester (linear density) of the tire cords of line *a* which indicates the plied cords of nonblended yarns of polyethylene terephthalate and polyhexamethylene adipamide. On the other hand, as the polyethylene terephthalate content increases to 80 percent in a line *a* (plied cords made of individual yarns (nonblended)), the flatspotting index approaches the desired level of 0.4 while the plied cords of line *b* made of blended yarns at 80 percent polyester is similar to 100 percent polyester. The preferred content of nylon in the nylon-polyester blended yarns plied into tire cords ranges from about 50 to about 80 percent of the total yarn linear density. In this range, sufficient nylon is available to provide the advantages of nylon, yet the tire cords made from the nylon containing polyester blended yarns of this invention provide substantially no flatspotting which is the advantage of 100 percent polyester tire cords.

The types of nylon yarns which can be utilized includes those produced from synthetic linear polyamides such as polyhexamethylene adipamide, polyhexamethylene sebacamide, polymerized 6-aminocaproic acid, polytetramethylene sebacamide, polytetramethylene adipamide and the like as well as polyadipamides prepared from di(4-aminocyclohexyl)ethane or 1,6-(4-aminocyclohexyl)hexane as the diamine component. The polyester yarns which can be utilized herein include among others: isophthalic acid, sebacic acid and the like. The yarns of the blends of nylon and polyester should have a tenacity in excess of 6 grams per denier and preferably in excess of 8 grams per denier to as high as 15 grams per denier while the elongational break of the yarn should be in excess of about 10 percent and preferably in excess of 12 to about 25 percent.

It is understood that the foregoing description is merely illustrative of preferred embodiments of the invention of which many variations may be made by those skilled in the art within the scope of the following claims, without departing from the spirit thereof.

What is claimed is:

1. A nylon containing tire cord yarn which when incorporated into tires as plied cords has reduced flatspotting properties comprising an intimate blend of nylon and polyester continuous filaments in the form of yarn wherein the linear density of the nylon ranges from about 20 to about 80 percent of the total yarn linear density, said yarn having a percent of elongation at break in excess of about 10 and tenacity in excess of 6 grams per denier.

2. The product of claim 1 wherein the individual filaments of nylon and polyester have an elongation at break in the range from about 10 to about 25 percent and tenacity from about 6 to about 15 grams per denier.

3. The product of claim 2 wherein the linear density of nylon ranges from about 50 to about 80 percent of the total yarn linear density.

4. The product of claim 2 wherein the nylon is polyhexamethylene adipamide and the polyester is polyethylene terephthalate.

5. The product of claim 4 wherein the linear density of polyhexamethylene adipamide ranges from about 40 to about 70 percent of the total yarn linear density, and the flatspot index is less than about 0.4 resulting in reduced flatspotting properties.

References Cited

UNITED STATES PATENTS

| 2,755,214 | 7/1956 | Lyons et al. | 57—140 XR |
| 2,939,202 | 6/1960 | Holland | 57—140 |
| 2,992,150 | 7/1961 | Goy | 57—140 XR |
| 3,071,919 | 1/1963 | Lord | 57—140 |
| 3,201,930 | 8/1965 | Stirling | 57—140 XR |

FOREIGN PATENTS

| 610,140 | 10/1948 | Great Britain. |
| 811,501 | 4/1959 | Great Britain. |
| 831,605 | 3/1960 | Great Britain. |

JOHN PETRAKES, *Primary Examiner.*

U.S. Cl. X.R.

260—78

---

[1] Rye, G. W., and Martin, V. E., "A Laboratory Test To Predict Flatspotting Behavior of Tire Cords," paper presented at the spring meeting of the Rubber Division, American Chemical Society, May 9, 1963, Toronto, Canada.